(12) United States Patent
Jeong et al.

(10) Patent No.: US 12,006,378 B2
(45) Date of Patent: Jun. 11, 2024

(54) POLYETHYLENE AND ITS CHLORINATED POLYETHYLENE

(71) Applicant: LG Chem, Ltd., Seoul (KR)

(72) Inventors: Cheolhwan Jeong, Daejeon (KR); Si Jung Lee, Daejeon (KR); Sun Mi Kim, Daejeon (KR); Ue Ryung Seo, Daejeon (KR); Yi Young Choi, Daejeon (KR); Bog Ki Hong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 592 days.

(21) Appl. No.: 17/294,896

(22) PCT Filed: Sep. 25, 2020

(86) PCT No.: PCT/KR2020/013051
§ 371 (c)(1),
(2) Date: May 18, 2021

(87) PCT Pub. No.: WO2021/060907
PCT Pub. Date: Apr. 1, 2021

(65) Prior Publication Data
US 2022/0017663 A1    Jan. 20, 2022

(30) Foreign Application Priority Data

Sep. 27, 2019 (KR) .................. 10-2019-0120102
Sep. 27, 2019 (KR) .................. 10-2019-0120103
Sep. 24, 2020 (KR) .................. 10-2020-0123878

(51) Int. Cl.
*C08F 110/02* (2006.01)
*C08F 4/02* (2006.01)
*C08F 4/6592* (2006.01)
*C08F 8/20* (2006.01)

(52) U.S. Cl.
CPC .............. *C08F 110/02* (2013.01); *C08F 4/02* (2013.01); *C08F 4/65922* (2013.01); *C08F 8/20* (2013.01); *C08F 2420/00* (2013.01)

(58) Field of Classification Search
CPC .. C08F 110/02; C08F 8/20; C08F 4/02; C08F 4/65922; C08F 2420/00
USPC ........................................................ 526/352
See application file for complete search history.

(56) References Cited

U.S. PATENT DOCUMENTS

| 5,032,562 A | 7/1991 | Lo et al. |
| 5,525,678 A | 6/1996 | Mink et al. |
| 5,693,719 A | 12/1997 | Goto et al. |
| 5,914,289 A | 6/1999 | Razavi |
| 10,570,532 B2 * | 2/2020 | Bae .................. D01F 6/04 |
| 2001/0012496 A1 | 8/2001 | Agapiou et al. |
| 2001/0020072 A1 | 9/2001 | Agapiou et al. |
| 2005/0143536 A1 | 6/2005 | Graf et al. |
| 2005/0244974 A1 | 11/2005 | Garcia-Franco et al. |
| 2012/0123013 A1 | 5/2012 | Ek et al. |
| 2013/0018154 A1 | 1/2013 | Buryak et al. |
| 2015/0018491 A1 | 1/2015 | Satoh et al. |
| 2015/0153878 A1 | 6/2015 | Kim |
| 2016/0369020 A1 | 12/2016 | Sung et al. |
| 2017/0158789 A1 | 6/2017 | Bellehumeur et al. |
| 2017/0298538 A1* | 10/2017 | Bae .................. C08F 4/65908 |
| 2018/0258559 A1* | 9/2018 | Dadmun ................... D01F 6/56 |
| 2019/0086308 A1 | 3/2019 | Lee et al. |
| 2019/0256629 A1* | 8/2019 | Chandak ................. C08F 10/02 |
| 2019/0263942 A1 | 8/2019 | Jeong et al. |
| 2020/0002490 A1* | 1/2020 | Kin ........................ C08F 210/16 |
| 2020/0071509 A1 | 3/2020 | Borse et al. |
| 2021/0095109 A1 | 4/2021 | Chandak et al. |
| 2022/0017663 A1 | 1/2022 | Jeong et al. |

FOREIGN PATENT DOCUMENTS

| CN | 1359396 A | 7/2002 |
| CN | 1643004 A | 7/2005 |
| CN | 102869716 A | 1/2013 |
| CN | 104024326 A | 9/2014 |
| CN | 105008439 A | 10/2015 |
| CN | 106062065 A | 10/2016 |
| CN | 106715480 A | 5/2017 |
| CN | 108290980 A | 7/2018 |
| CN | 109415450 A | 3/2019 |
| CN | 109890855 A | 6/2019 |
| CN | 109923133 A | 6/2019 |
| CN | 110012669 A | 7/2019 |
| JP | 2005528412 A | 9/2005 |
| JP | 2010189396 A | 9/2010 |
| JP | 5907079 B2 | 4/2016 |
| KR | 20000029853 A | 5/2000 |
| KR | 100269845 B1 | 10/2000 |
| KR | 20040091742 A | 10/2004 |

(Continued)

OTHER PUBLICATIONS

Search report from International Application No. PCT/KR2020/013052, dated Jan. 4, 2021; 3 pages.
Alexakis A. et al., "Mild Protection and Deprotection of Alcohols as Ter-Butyl Ethers in the Field of Pheromone Synthesis." Tetrahedron Letters, Jan. 1, 1988, vol. 29, No. 24, pp. 2951-2954.
International Search Report for PCT/KR2020/013051 dated Jan. 12, 2021; 2 pages.
Search Report dated Oct. 12, 2022 from the Office Action for Chinese Application No. 202080006137.1 dated Oct. 18, 2022, 3 pages.

(Continued)

*Primary Examiner* — Michael M. Bernshteyn
(74) *Attorney, Agent, or Firm* — Lerner David LLP

(57) ABSTRACT

There are provided a polyethylene capable of improving tensile strength while maintaining excellent processability and Mooney viscosity characteristics when preparing a chlorinated polyethylene compound by implementing a molecular structure having a low content of low molecular weight and a high content of high molecular weight, and a chlorinated polyethylene prepared using the same.

11 Claims, No Drawings

(56) References Cited

FOREIGN PATENT DOCUMENTS

| KR | 20120123675 | A | | 11/2012 | | |
|---|---|---|---|---|---|---|
| KR | 101398607 | B1 | | 6/2014 | | |
| KR | 20150063823 | A | | 6/2015 | | |
| KR | 101603407 | B1 | | 3/2016 | | |
| KR | 20160112424 | A | | 9/2016 | | |
| KR | 20160121940 | A | | 10/2016 | | |
| KR | 20170076550 | A | | 7/2017 | | |
| KR | 20170106110 | A | | 9/2017 | | |
| KR | 20180058574 | A | | 6/2018 | | |
| KR | 20190086989 | A | | 7/2019 | | |
| KR | 20210020424 | A | | 2/2021 | | |
| WO | 9806728 | A1 | | 2/1998 | | |
| WO | 0014129 | A1 | | 3/2000 | | |
| WO | 0105852 | A1 | | 1/2001 | | |
| WO | WO-2015078924 | A1 | * | 6/2001 | ............. | C08L 23/06 |
| WO | 03091265 | A1 | | 11/2003 | | |
| WO | 2015078924 | A1 | | 6/2015 | | |
| WO | 2016167547 | A1 | | 10/2016 | | |
| WO | 2016204457 | A1 | | 12/2016 | | |
| WO | 2018089195 | A1 | | 5/2018 | | |
| WO | 2019125065 | A1 | | 6/2019 | | |

OTHER PUBLICATIONS

Search Report dated Sep. 5, 2022 from the Office Action for Chinese Application No. 202080006688.8 dated Sep. 14, 2022, 3 pages.
Extended European Search Report including Written Opinion for Application No. 20867639.5 dated Apr. 19, 2022, pp. 1-8.
Extended European Search Report including Written Opinion for Application No. 20870137.5 dated Apr. 21, 2022, pp. 1-9.

* cited by examiner

POLYETHYLENE AND ITS CHLORINATED POLYETHYLENE

CROSS-REFERENCE TO RELATED APPLICATIONS

This application is a national phase entry under 35 U.S.C. § 371 of International Application No. PCT/KR2020/013051, filed on Sep. 25, 2020, which claims priority to Korean Patent Applications Nos. 10-2019-0120102 and 10-2019-0120103, filed on Sep. 27, 2019 and Korean Patent Application No. 10-2020-0123878 filed on Sep. 24, 2020 with the Korean Intellectual Property Office, the disclosures of which are incorporated herein by reference in their entirety.

The present disclosure relates to a polyethylene capable of improving tensile strength while maintaining excellent processability and Mooney viscosity characteristics when preparing a chlorinated polyethylene compound by implementing a molecular structure having a low content of low molecular weight and a high content of high molecular weight, and a chlorinated polyethylene prepared using the same.

BACKGROUND ART

Olefin polymerization catalyst systems may be divided into Ziegler-Natta and metallocene catalysts, and these highly active catalyst systems have been developed in accordance with their characteristics. Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties. In particular, physical properties may be deteriorated by polymer chains having a relatively low molecular weight due to a broad molecular weight distribution.

Meanwhile, the metallocene catalyst includes a main catalyst having a metallocene compound as a main component and an organometallic compound cocatalyst having aluminum as a main component. The stereoregularity, copolymerization characteristics, molecular weight, crystallinity, etc. of the resulting polymer may be controlled by changing a ligand structure of the catalyst and polymerization conditions.

U.S. Pat. No. 5,032,562 discloses a method for preparing a polymerization catalyst by supporting two different transition metal catalysts on one support. This catalyst is prepared by supporting a titanium (Ti)-based Ziegler-Natta catalyst which produces a high molecular weight and a zirconium (Zr)-based metallocene catalyst which produces a low molecular weight on one support, and results in a bimodal molecular weight distribution. This catalyst is disadvantageous in that the supporting procedure is complicated and morphology of polymers is poor due to a cocatalyst.

U.S. Pat. No. 5,525,678 discloses a method for using a catalyst system for olefin polymerization, in which a metallocene compound and a non-metallocene compound are simultaneously supported on a support to realize simultaneous polymerization of a high molecular weight polymer and a low molecular weight polymer. However, there are disadvantages that the metallocene compound and non-metallocene compound must be separately supported and the support must be pretreated with various compounds for supporting.

U.S. Pat. No. 5,914,289 discloses a method for controlling a molecular weight and a molecular weight distribution of polymers using metallocene catalysts which are respectively supported on supports. However, a large amount of solvent and a long period of time are required to prepare the supported catalysts, and a process of supporting metallocene catalysts on the respective supports is troublesome.

Moreover, according to the prior art, there is a disadvantage in that it is difficult to effectively prepare a polyolefin, in particular, an ethylene (co)polymer satisfying a desired level of density and a narrow molecular weight distribution at the same time.

Meanwhile, chlorinated polyethylene (CPE) is a product obtained by substituting a part of hydrogen in polyethylene with chlorine, and is used as an impact modifier for polyvinyl chloride (PVC) or cross-linked to manufacture cable sheath or a rubber hose.

Chlorinated polyethylene is used as a material for cable sheath in a structure that is thermally cross-linked by a peroxide-based cross-linking agent. In order to prevent damages to the sheath when the cable is bent, the chlorinated polyethylene must have excellent tensile strength in the cross-linked compound.

In the case of PVC compound products, the strength of the compound varies depending on the properties of the chlorinated polyolefin. In the case of general-purpose chlorinated polyethylenes which are widely known at present, since a polyethylene prepared using Ziegler-Natta catalyst is applied, the uniformity in chlorine distribution is decreased in the polyethylene due to the broad molecular weight distribution. There is also a disadvantage in that impact strength is insufficient when compounded with PVC.

Recently, in order to improve tensile strength of chlorinated polyolefin compounds for cables, high-density polyethylene (HDPE) prepared using a metallocene catalyst is chlorinated to produce a chlorinated polyethylene, and then a cross-linking agent is added thereto to prepare a compound.

In general, the higher the Mooney viscosity (MV) of the chlorinated polyethylene and the higher the Mooney viscosity of the compound, the higher the tensile strength of the compound, but there is a problem that processability decreases during compression.

Accordingly, there is a demand for preparation of a high-density polyethylene capable of improving tensile strength of a compound without deteriorating processability while having a similar Mooney viscosity, and development of a catalyst therefor.

DETAILED DESCRIPTION OF THE INVENTION

Technical Problem

Accordingly, there are provided a polyethylene capable of improving tensile strength while maintaining excellent processability and Mooney viscosity characteristics when preparing a chlorinated polyethylene compound by implementing a molecular structure having a low content of low molecular weight and a high content of high molecular weight, and a preparation method thereof.

There is also provided a chlorinated polyethylene prepared using the above polyethylene.

Technical Solution

According to an embodiment of the present disclosure, there is provided a polyethylene having a density (measured in accordance with ASTM D-1505) of 0.945 g/cm³ or more, wherein a fraction of an area representing a high molecular weight content of log Mw>6.0 is 4 to 12%, a fraction of an area representing a medium molecular weight content of 4.5<log Mw<5.0 is 35 to 50%, and a fraction of an area representing a low molecular weight content of log Mw<4.0 is 10% or less, relative to a total area of a molecular weight distribution curve drawn with a log value of weight average molecular weight (log Mw) as the x axis and a molecular weight distribution with respect to the log value (dw/d log Mw) as the y axis using gel permeation chromatography, and an entanglement molecular weight ($M_e$) of the following Equation 1 is 27,000 to 52,000 g/mol:

$$M_e = (\rho RT)/G_N^0 \quad \text{[Equation 1]}$$

(in Equation 1, $\rho$ is a density (kg/m³) of polyethylene measured in accordance with ASTM D-1505×0.8, R is a gas constant of polyethylene (8.314 Pa·m³/mol·K), T is an absolute temperature (K) of the measured temperature, and $G_N^0$ is a plateau modulus of polyethylene, which is a storage modulus when a loss modulus has a minimum value in a region where the storage modulus is greater than the loss modulus, wherein the storage modulus and loss modulus are measured while changing an angular frequency to 0.05 to 500 rad/s under conditions of 190° C. and 0.5% strain using a rotary rheometer.)

According to another embodiment of the present disclosure, there is provided a chlorinated polyethylene prepared by reacting the polyethylene with chlorine.

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "contain" when used in this specification, specify the presence of stated features, numbers, steps, components, or combinations thereof, but do not preclude the presence or addition of one or more other features, numbers, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the polyethylene, the preparation method of the same, and the chlorinated polyethylene prepared using the polyethylene according to specific embodiments of the present disclosure will be described in more detail.

High tensile strength is required for a chlorinated polyethylene used for rubber hoses or cable sheath. Although the tensile strength of the chlorinated polyethylene can be improved by increasing the Mooney viscosity of the chlorinated polyethylene or the Mooney viscosity of the compound, there is a problem that extrusion processability is deteriorated. In order to solve this problem, it is necessary to optimize a molecular structure of polyethylene, specifically high density polyethylene applied to the chlorinated polyethylene.

It was confirmed in the present disclosure that using two kinds of transition metal compounds having a specific structure in combination could provide a polyethylene having a high content of high molecular weight with a minimized content of low molecular weight. Thus, the polyethylene has an increased degree of cross-linking and maintains excellent processability and Mooney viscosity characteristics when preparing a chlorinated polyethylene compound, while improving tensile strength. Based on this, the present invention has been completed.

In the present disclosure, a molecular weight distribution curve is drawn with a log value of weight average molecular weight (log Mw) as the x axis and a molecular weight distribution with respect to the log value (dw/d log Mw) as the y axis using gel permeation chromatography (GPC). log Mw>6.0, the weight average molecular weight (Mw) exceeding $10^{6.0}$ g/mol, is defined as 'high molecular weight', log Mw<4.0, the weight average molecular weight (Mw) less than $10^{4.0}$ g/mol is defined as 'low molecular weight', and 4.0≤log Mw≤6.0, the weight average molecular weight (Mw) of $10^{4.0}$ g/mol or more and $10^{6.0}$ g/mol or less is defined as 'medium molecular weight'.

In addition, the high molecular weight content and the low molecular weight content can be calculated from an area ratio occupied by log Mw>6.0 area or log Mw<4.0 area relative to a total area of the molecular weight distribution curve, that is, a fraction (%) in the graph having the x-axis of log Mw and the y-axis of dw/d log Mw obtained by GPC.

In the present disclosure, the molecular weight distribution curve of the polyethylene may be specifically measured using Waters PL-GPC220 as the gel permeation chromatography (GPC) instrument, and a Polymer Laboratories PLgel MIX-B 300 mm length column. An evaluation temperature may be 160° C., and 1,2,4-trichlorobenzene may be used for a solvent at a flow rate of 1 mL/min. Each polyethylene sample may be pretreated by dissolving in 1,2,4-trichlorobenzene containing 0.0125% of BHT (butylylated hydroxytoluene) for 10 hours using a GPC analyzer (PL-GP220), and the sample with a concentration of 10 mg/10 mL may be supplied in an amount of 200 μL. Mw and Mn may be obtained using a calibration curve formed using a polystyrene standard. 9 kinds of the polystyrene standard are used with the molecular weight of 2000 g/mol, 10000 g/mol, 30000 g/mol, 70000 g/mol, 200000 g/mol, 700000 g/mol, 2000000 g/mol, 4000000 g/mol, and 10000000 g/mol.

Specifically, the polyethylene according to the present disclosure has a density of 0.945 g/cm³ or more when measured in accordance with ASTM D-1505, wherein a fraction of an area representing a high molecular weight content of log Mw>6.0 is 4 to 12%, a fraction of an area representing a medium molecular weight content of 4.5<log Mw<5.0 is 35 to 50%, and a fraction of an area representing a low molecular weight content of log Mw<4.0 is 10% or less, relative to a total area of a molecular weight distribution curve drawn with a log value of weight average molecular weight as the x axis and a molecular weight distribution with respect to the log value as the y axis using gel permeation chromatography, and an entanglement molecular weight ($M_e$) of the following Equation 1 is 27,000 to 52,000 g/mol.

The content of high molecular weight and the content of low molecular weight in the polyethylene molecule affect physical properties of polyethylene such as the degree of cross-linking. For example, the lower the low molecular weight content and the higher the high molecular weight content in the polyethylene, the higher the degree of cross-linking. However, when preparing a chlorinated polyethylene compound, the Mooney viscosity increases, resulting in a decrease in processability. On the other hand, when the low molecular weight content in the polyethylene is too high, the low molecular weight component is melted and fluidity becomes high, so that pores of polyethylene particles may be blocked, resulting in low chlorination productivity.

In the polyethylene according to an embodiment of the present disclosure, a fraction of a content of low molecular weight less than Mw $10^{4.0}$ g/mol, that is, a fraction of an area representing a low molecular weight content of log Mw<4.0 in the molecular weight distribution curve is 10% or less, more specifically 7% or less, or 5% or less. In addition, among the above-described low molecular weight content, a fraction of a content of ultra-low molecular weight less than Mw $10^{3.5}$ g/mol, that is, a fraction of an area representing a ultra-low molecular weight content of log Mw<3.5 in the molecular weight distribution curve is 2% or less, 1.5% or less, or 1% or less, and a content of low molecular weight of Mw $10^{3.5}$ g/mol or more and less than Mw $10^{4.0}$ g/mol, that is, a low molecular weight content of 3.5≤log Mw<4.0 is 7% or less, 5% or less, or 4% or less. When having the low content of low molecular weight as described above, the degree of cross-linking increases, and a decrease in chlorination productivity caused by melting of the low molecular weight component can be prevented.

In addition, in the polyethylene, a fraction a content of high molecular weight more than Mw $10^{6.0}$ g/mol, that is, a fraction of an area representing a high molecular weight content of log Mw>6.0 in the molecular weight distribution curve is 4 to 12%. When the fraction of an area representing a high molecular weight content is less than 4%, there is a concern that the degree of cross-linking may decrease, and when it exceeds 12%, there is a concern that Mooney viscosity of the chlorinated polyethylene increases due to an excessively high content of high molecular weight content, and thus processability may be deteriorated. More specifically, a fraction of an area representing a high molecular weight content of log Mw>6.0 may be 5% or more, 7% or more and 12% or less, or 10% or less in the molecular weight distribution curve of the polyethylene.

Further, the polyethylene has a structure in which a high molecular weight tail is formed in the molecular weight distribution curve. Accordingly, among the above-described high molecular weight content, a fraction of an area representing a ultra-high molecular weight content of 6.5<log Mw, more specifically 6.5<log Mw≤7.0 may be 0.1 to 3%, more specifically 0.1% or more, 0.5% or more, or 0.7% or more and 3% or less, 2% or less, or 1.6% or less. When having a higher content of ultra-high molecular weight than the conventional one, it is possible to exhibit more improved degree of cross-linking and entanglement characteristics.

When the low molecular weight content is low and the high molecular weight content is high in the polyethylene, there is a problem of an increase in Mooney viscosity and thus a decrease in processability in the preparation of a chlorinated polyethylene compound. As the polyethylene has a fraction of an area representing a medium molecular weight content of 4.5<log Mw<5.0 of 35 to 50%, more specifically 35% or more and 50% or less, or 45% or less, excellent processability and Mooney viscosity characteristics of the chlorinated polyethylene may be maintained.

In addition, the polyethylene has a high density of 0.945 g/cm³ or more, or 0.945 to 0.955 g/cm³. This means that the crystal structure of the polyethylene has a high content and is dense, and the crystal structure is difficult to change during chlorination. In the present disclosure, the density of polyethylene can be measured in accordance with ASTM D-1505.

Further, the polyethylene has an entanglement molecular weight ($M_e$) of 27,000 g/mol or more and 52,000 g/mol or less. The entanglement molecular weight refers to an average molecular weight of entanglement points between ethylene polymer chains. As the entanglement molecular weight is smaller, the degree of entanglement of the ethylene polymer chains is increased, which means superior resistance to deformation by external force and excellent crack resistance. In general, processability and long-term durability are opposite properties, and thus if a melt index or a melt flow rate ratio is increased to increase processability, the long-term durability decreases.

The polyethylene of the present disclosure has the entanglement molecular weight in the above-described range when calculated according to the following Equation 1 by using a plateau modulus ($G_N^0$) obtained from a storage modulus and a loss modulus of the polyethylene measured at a temperature of 150 to 230° C., specifically at 190° C. at an angular frequency of 0.05 rad/s to 500 rad/s at 0.5% strain, thereby exhibiting excellent long-term durability without deterioration in processability. More specifically, the polyethylene has an entanglement molecular weight of 30,000 g/mol or more, or 33,000 g/mol or more and 50,000 g/mol or less, or 49,500 g/mol or less.

In the present disclosure, the entanglement molecular weight (Me) may be calculated according to the following Equation 1:

$$M_e = (\rho RT)/G_N^0 \qquad \text{[Equation 1]}$$

in Equation 1, $\rho$ is a density (kg/m³) of polyethylene measured in accordance with ASTM D-1505×0.8, R is a gas constant of polyethylene (8.314 Pa·m³/mol·K), T is an absolute temperature (K) of the measured temperature, and $G_N^0$ is a plateau modulus of polyethylene, which is a storage modulus when a loss modulus has a minimum value in a region where the storage modulus is greater than the loss modulus, wherein the storage modulus and loss modulus are measured while changing an angular frequency to 0.05 to 500 rad/s under conditions of 190° C. and 0.5% strain using a rotary rheometer.

In addition, when the polyethylene is intended to prepare a chlorinated polyethylene having a Mooney Viscosity (MV) of 70 or more in order to prevent the degradation in physical properties of the CPE compound, a melt index ($MI_5$; measured at 190° C. under a load of 5.0 kg in accordance with ASTM D 1238) is preferably 3 g/10 min or less. Further, when the polyethylene is intended to prepare a chlorinated polyethylene having a Mooney Viscosity (MV) of 80 or less in order to prevent the degradation in processability of the CPE compound, a melt index is preferably 0.5 g/10 min or more. Specifically, the melt index of $MI_5$ of the polyethylene may be 0.5 to 3 g/10 min, more specifically 0.5 g/10 min or more, or 1 g/10 min or more and 3 g/10 min or less, or 2.5 g/10 min or less.

The polyethylene may have a melt flow rate ratio (MFRR$_{21.6/5}$ obtained by dividing MFR$_{21.6}$ measured at 190° C. under a load of 21.6 kg in accordance with ASTM D 1238 by MFR$_5$ measured at 190° C. under a load of 5 kg in accordance with ASTM D 1238) of 10 to 20. When having the melt flow index in the above range, the MV may be appropriately controlled without deteriorating physical properties of the chlorinated polyethylene, and excellent processability and an effect of improving tensile strength of the compound may be achieved. If the melt flow rate ratio exceeds 20, there is a concern that physical properties of the CPE compound may be deteriorated, and if it is less than 10, processability of the CPE compound may decrease. More specifically, it may be 10 or more, or 10.3 or more and 20 or less, 15 or less, 12 or less, or 11 or less.

In addition, the polyethylene has a high weight average molecular weight (Mw) and molecular weight distribution (PDI). Specifically, the polyethylene has a weight average molecular weight (Mw) of 150,000 to 300,000 g/mol, more specifically 150,000 g/mol or more, or 185,000 g/mol or more and 300,000 g/mol or less, or 250,000 g/mol or less. Further, the polyethylene has PDI of 5 to 15, more specifically, 5 or more, or 5.5 or more and 15 or less, or 10 or less. If the molecular weight distribution exceeds 15, a difference in molecular weight between polyethylenes is large, so the uniform distribution of chlorine in the chlorinated polyethylene after the chlorination reaction is difficult. When having the Mw and PDI in the above range, the effect of improving processability with excellent mechanical properties can be achieved in a good balance. In particular, the difference in molecular weight between polyethylenes after the chlorination reaction is not large, and thus chlorine may be uniformly substituted.

In the present disclosure, the weight average molecular weight and the molecular weight distribution (PDI, polydispersity index) may be measured using gel permeation chromatography. The molecular weight distribution may be determined by measuring a weight average molecular weight (Mw) and a number average molecular weight (Mn), and then dividing the weight average molecular weight by the number average molecular weight. The specific method thereof is as described in Experimental Examples to be described later.

In addition, the polyethylene may have an MDR torque (M$_H$–M$_L$) of 7 Nm or more, 10 Nm or more, or 11 Nm or more and 12 Nm or less, or 11.8 Nm or less. When having the MDR torque within the above range, a high degree of cross-linking and excellent mechanical properties may be achieved.

Herein, the MDR torque (M$_H$–M$_L$) of the polyethylene refers to the degree of cross-linking. The higher the degree of cross-linking, the higher the M$_H$–M$_L$. The high MDR torque means an excellent cross-linking efficiency when the same cross-linking agent is applied. The MDR torque of the polyethylene may be measured, for example, using a moving die rheometer (MDR) by measuring a M$_H$ value and a M$_L$ value at 180° C. for 10 min, and subtracting the M$_L$ value from the M$_H$ value to calculate the MDR torque. Herein, the M$_H$ is a maximum vulcanizing torque measured at full cure, and the M$_L$ is a minimum vulcanizing torque stored. The specific method thereof is as described in Experimental Examples to be described later.

Meanwhile, the polyethylene according to the present disclosure may be an ethylene homopolymer containing no comonomer.

The optimum molecular structure and physical properties of the polyethylene may be implemented by a preparation method including the step of polymerizing ethylene monomers in the presence of a hybrid supported catalyst including a first transition metal compound of the following Chemical Formula 1, a second transition metal compound of the following Chemical Formula 2, and a support on which the first and second transition metal compounds are supported, while introducing hydrogen gas, wherein the first transition metal compound and the second transition metal compound are used in a molar ratio of 1:3 to 3:1. Accordingly, another embodiment of the present disclosure provides a preparation method of the polyethylene.

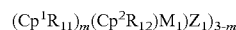   [Chemical Formula 1]

In Chemical Formula 1,

M$_1$ is a transition metal of Group 4;

Cp$^1$ and Cp$^1$ are the same as or different from each other, and each independently any one selected from the group consisting of cyclopentadienyl, indenyl, 4,5,6,7-tetrahydro-1-indenyl, and fluorenyl radicals. Herein, they may be substituted with C$_{1-20}$ hydrocarbon.

R$_{11}$ and R$_{12}$ are the same as or different from each other, and each independently hydrogen, C$_{1-20}$ alkyl, C$_{1-20}$ alkoxy, C$_{2-20}$ alkoxyalkyl, C$_{6-20}$ aryl, C$_{6-20}$ aryloxy, C$_{2-20}$ alkenyl, C$_{7-40}$ alkylaryl, C$_{7-40}$ arylalkyl, C$_{8-40}$ arylalkenyl, C$_{2-20}$ alkynyl, or C$_{2-20}$ heteroaryl including one or more heteroatoms selected from the group consisting of N, O and S;

Z$_1$ is halogen, C$_{1-20}$ alkyl, C$_{2-20}$ alkenyl, C$_{7-40}$ alkylaryl, C$_{7-40}$ arylalkyl, C$_{6-20}$ aryl, substituted or unsubstituted C$_{1-20}$ alkylidene, a substituted or unsubstituted amino group, C$_{2-20}$ alkylalkoxy, or C$_{7-40}$ arylalkoxy; and m is 1 or 0;

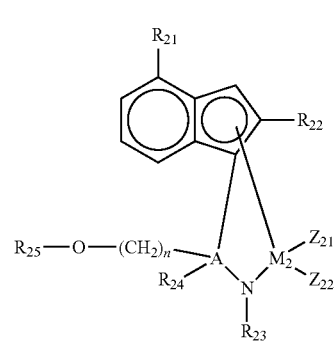   [Chemical Formula 2]

In Chemical Formula 2,

A is carbon or silicon,

M$_2$ is a transition metal of Group 4,

R$_{21}$ is C$_{6-20}$ aryl substituted with C$_{1-20}$ alkyl,

R$_{22}$ is C$_{3-20}$ branched alkyl,

R$_{23}$ to R$_{25}$ are each independently C$_{1-20}$ alkyl,

Z$_{21}$ and Z$_{22}$ are each independently halogen or C$_{1-10}$ alkyl, and n is an integer of 1 to 10.

In the hybrid supported catalyst, the substituents in Chemical Formulae 1 and 2 will be described in more detail as follows.

The C$_{1-20}$ alkyl group may include linear, branched, or cyclic alkyl groups, and specifically, a methyl group (Me), an ethyl group (Et), a propyl group (Pr), an isopropyl group, an n-butyl group (n-Bu), a tert-butyl group (t-Bu), a pentyl group (Pt), a hexyl group (Hx), a heptyl group, an octyl group, a cyclobutyl group, a cyclopentyl group, a cyclohexyl group, or the like, but is not limited thereto.

The $C_{1-20}$ alkylene group may include a linear or branched alkylene group, and specifically, a methylene group, an ethylene group, a propylene group, a butylene group, a pentylene group, a hexylene group, or the like, but is not limited thereto.

The $C_{4-20}$ cycloalkyl group refers to a cyclic alkyl group among the above-described alkyl groups, and specifically, may include a cyclobutyl group, a cyclopentyl group, a cyclohexyl group, or the like, but is not limited thereto.

The $C_{2-20}$ alkenyl group may include a linear or branched alkenyl group, and specifically, an allyl group, an ethenyl group, a propenyl group, a butenyl group, a pentenyl group, or the like, but is not limited thereto.

The $C_{6-20}$ aryl group may include a monocyclic or condensed ring aryl group, and specifically, a phenyl group, a biphenyl group, a naphthyl group, a phenanthrenyl group, a fluorenyl group, or the like, but is not limited thereto.

The $C_{1-20}$ alkoxy group may include a methoxy group, an ethoxy group, a phenyloxy group, a cyclohexyloxy group, or the like, but is not limited thereto.

The $C_{2-20}$ alkoxyalkyl group may be a functional group in which one or more hydrogens of the alkyl group as described above are substituted with alkoxy, and specifically, may include alkoxyalkyl groups such as a methoxymethyl group, a methoxyethyl group, ethoxymethyl group, an iso-propoxymethyl group, an iso-propoxyethyl group, an iso-propoxyhexyl group, a tert-butoxymethyl group, a tert-butoxyethyl group, a tert-butoxyhexyl group, or the like; or aryloxyalkyl groups such as a phenoxyhexyl group, or the like, but is not limited thereto.

The $C_{1-20}$ alkylsilyl group or the $C_{1-20}$ alkoxysilyl group may be a functional group in which one to three hydrogens of $-SiH_3$ are substituted with one to three alkyl groups or alkoxy groups as described above, and specifically, may include alkylsilyl groups such as a methylsilyl group, a dimethylsilyl group, a trimethylsilyl group, a dimethylethylsilyl group, a diethylmethylsilyl group, a dimethylpropylsilyl group, or the like; alkoxysilyl groups such as a methoxysilyl group, a dimethoxysilyl group, a trimethoxysilyl group, a dimethoxyethoxysilyl group, or the like; alkoxyalkylsilyl groups such as a methoxydimethylsilyl group, a diethoxymethylsilyl group, a dimethoxypropylsilyl group, or the like, but is not limited thereto.

The $C_{1-20}$ silylalkyl group is a functional group in which one or more hydrogens of the alkyl group as described above are substituted with silyl, and specifically, may include $-CH_2-SiH_3$, a methylsilylmethyl group, a dimethylethoxysilylpropyl group, or the like, but is not limited thereto.

The halogen may be fluorine (F), chlorine (Cl), bromine (Br), or iodine (I).

The sulfonate group has a structure of $-O-SO_2-R'$, wherein R' may be a $C_{1-20}$ alkyl group. Specifically, the $C_{1-20}$ sulfonate group may include a methanesulfonate group, a phenylsulfonate group, or the like, but is not limited thereto.

The heteroaryl is $C_{2-20}$ heteroaryl including one or more of N, O, and S as a heteroatom, and specific examples thereof may include xanthene, thioxanthen, thiophene, furan, pyrrole, imidazole, thiazole, oxazole, oxadiazole, triazole, pyridyl, bipyridyl, pyrimidyl, triazine, acridyl, pyridazine, pyrazinyl, quinolinyl, quinazoline, quinoxalinyl, phthalazinyl, pyrido pyrimidinyl, pyrido pyrazinyl, pyrazino pyrazinyl, isoquinoline, indole, carbazole, benzoxazole, benzoimidazole, benzothiazole, benzocarbazole, benzothiophene, dibenzothiophene, benzofuranyl, phenanthroline, isooxazolyl, thiadiazolyl, phenothiazinyl, dibenzofuranyl, or the like, but is not limited thereto.

The above-described substituents may be optionally, within a range exhibiting the identical or similar effect to the desired effect, substituted with one or more substituents selected from the group consisting of hydroxyl; halogen; alkyl, alkenyl, aryl, or alkoxy; alkyl, alkenyl, aryl, or alkoxy including one or more hetero atoms among hetero atoms of Group 14 to 16; silyl; alkylsilyl or alkoxysilyl; phosphine; phosphide; sulfonate; and sulfone.

Further, the transition metal of Group 4 may include titanium (Ti), zirconium (Zr), hafnium (Hf), or the like, but the present disclosure is not limited thereto.

In the hybrid supported catalyst, the first transition metal compound exhibits high polymerization activity and it is easy to prepare a low molecular weight polymer. And, it is easier to prepare a high molecular weight polymer with the second transition metal compound compared to the first transition metal compound. Accordingly, when adjusting a mixing ratio of the first and second transition metal compounds in the hybrid supported catalyst, the low molecular weight content in the prepared polymer is minimized, and the molecular weight distribution may be increased due to high molecular weight characteristics by the second transition metal compound. In addition, the viscosity can be easily adjusted. The polyethylene thus prepared may have increased degree of cross-linking and entanglement.

Specifically, the first transition metal compound represented by the Chemical Formula 1 is a non-cross-linked compound containing ligands of $Cp^1$ and $Cp^2$, wherein the ligands of $Cp^1$ and $Cp^2$ may be the same or different from each other, and each independently any one selected from the group consisting of cyclopentadienyl, indenyl, 4,5,6,7-tetrahydro-1-indenyl, and fluorenyl radicals. These ligands may be substituted with one or more, or one to three $C_{1-20}$ hydrocarbons, more specifically $C_{1-10}$ alkyl. As the ligands of $Cp^1$ and $Cp^2$ have a pair of non-covalent electrons capable of acting as a Lewis base, high polymerization activity may be achieved. Particularly, when the ligands of $Cp^1$ and $Cp^2$ are cyclopentadienyl with relatively little steric hindrance, they exhibit high polymerization activity and low hydrogen reactivity, and thus olefin polymers having a low molecular weight can be polymerized with high activity.

In addition, the ligands of $Cp^1$ and $Cp^2$ can easily control properties such as chemical structure, molecular weight, molecular weight distribution, mechanical properties, and transparency of the olefin polymer to be prepared by adjusting the degree of steric hindrance effect depending on the type of the substituted functional groups. Specifically, the ligands of $Cp^1$ and $Cp^2$ are substituted with $R_{11}$ and $R_{12}$, respectively, wherein $R_{11}$ and $R_{12}$ are the same as or different from each other, and each may independently be hydrogen, $C_{1-20}$ alkyl, $C_{2-20}$ alkoxyalkyl, $C_{7-40}$ arylalkyl, or $C_{2-12}$ heteroaryl containing at least one heteroatom selected from the group consisting of N, O and S, and more specifically $C_{1-10}$ alkyl, $C_{2-10}$ alkoxyalkyl, $C_{7-20}$ arylalkyl, or $C_{4-12}$ heteroaryl containing at least one heteroatom selected from the group consisting of N, O and S. In order to have excellent catalytic activity, at least one of $R_{11}$ and $R_{12}$ may be $C_{2-20}$ alkoxyalkyl or $C_{2-10}$ alkoxyalkyl when each of $R_{11}$ and $R_{12}$ is the substituent defined above.

Further, $M_1(Z_1)_{3-m}$ exists between the ligands of $Cp^1$ and $Cp^2$, and $M_1(Z_1)_{3-m}$ may affect storage stability of a metal complex. To more effectively ensure the effect, $Z_1$ may be each independently halogen or $C_{1-20}$ alkyl, and more specifically, each independently F, Cl, Br, or I. Further, $M_1$ may be Ti, Zr, or Hf, and more specifically, Zr or Hf, and much more specifically, Zr.

More specifically, in the first transition metal compound, $M_1$ is Ti, Zr, or Hf; $Cp^1$ and $Cp^2$ are the same as or different from each other, and each independently, any one selected from the group consisting of cyclopentadienyl, indenyl, 4,5,6,7-tetrahydro-1-indenyl, and fluorenyl radicals, which may be unsubstituted or substituted with $C_{1-10}$ alkyl; $R_{11}$ and $R_{12}$ are each independently hydrogen, $C_{1-20}$ alkyl, $C_{2-20}$ alkoxyalkyl, $C_{6-20}$ aryl, $C_{7-20}$ arylalkyl, furanyl, or thiophenyl, wherein at least one of $R_{11}$ and $R_{12}$ is $C_{2-20}$ alkoxyalkyl; $Z_1$ is halogen.

The first transition metal compound represented by Chemical Formula 1 may be, for example, a compound represented by any one of the following structural formulae, but is not limited thereto:

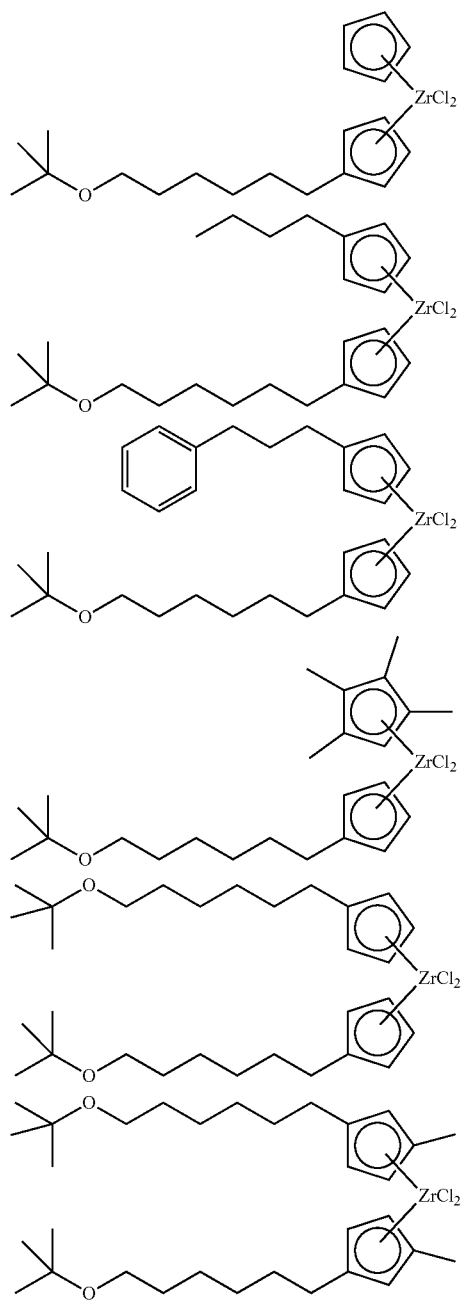

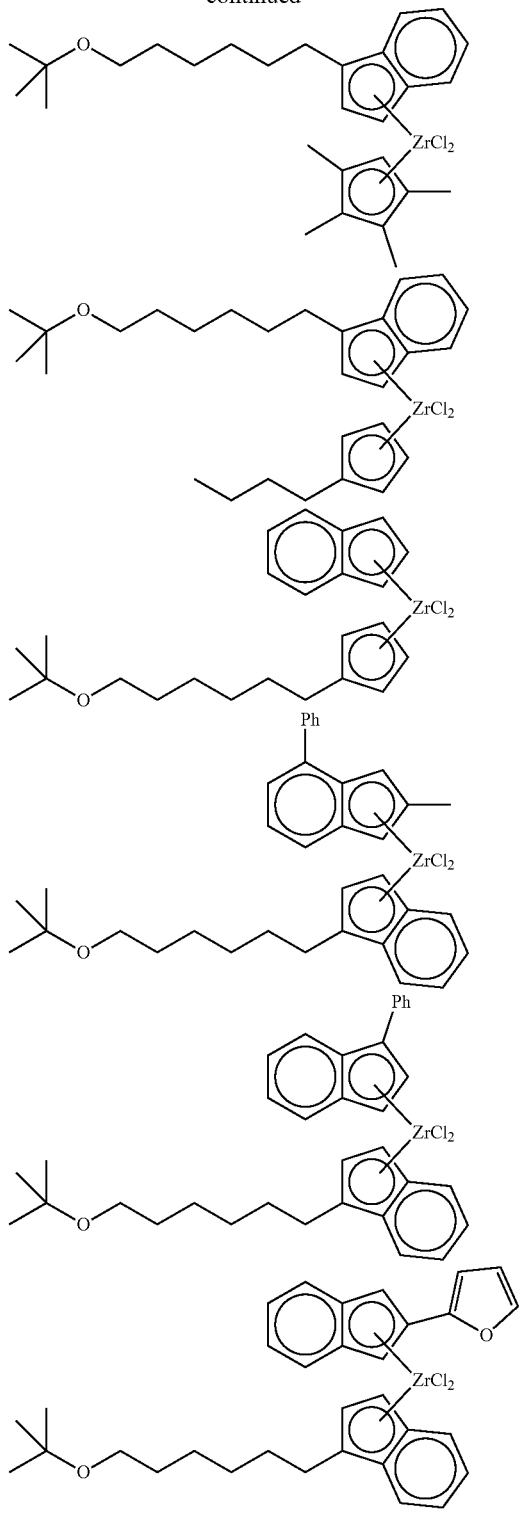

Further, the first transition metal compound may be a compound in which $M_1$ is Zr; $Cp^1$ and $Cp^2$ are each independently an unsubstituted cyclopentadienyl group or a cyclopentadienyl group substituted with at least one $C_{1-10}$ alkyl such as methyl; $R_{11}$ and $R_{12}$ are each independently hydrogen, $C_{1-20}$ alkyl, $C_{2-20}$ alkoxyalkyl, $C_{7-20}$ aryl, or $C_{7-20}$ arylalkyl, wherein at least one or both of $R_{11}$ and $R_{12}$ are $C_{2-20}$ alkoxyalkyl, more specifically $C_{2-10}$ alkoxyalkyl, and even more specifically t-butoxyhexyl; $Z_1$ is a halogen group; and m is 1 in Chemical Formula 1.

The first transition metal compound represented by Chemical Formula 1 may be synthesized by applying known reactions. Specifically, a ligand compound is prepared by various synthesis processes, and then metalation is performed by adding a metal precursor compound. However, the present disclosure is not limited thereto, and the synthesis method can be referred to Examples.

Meanwhile, in the hybrid supported catalyst, the second transition metal compound represented by the Chemical Formula 2 forms a ligand structure in which an indene derivative and an amine derivative are cross-linked by a bridge compound, and has a pair of non-covalent electrons capable of acting as a Lewis base in the ligand structure, thereby exhibiting high polymerization activity. Particularly, the catalyst may exhibit high catalytic activity by having the indene structure which is structurally stable and electronically rich, and may exhibit excellent supporting stability for a support by including a tether group in the bridge group.

In addition, the second transition metal compound is substituted with a functional group ($R_{22}$) having a branched structure at position 2 of the indene structure, and beta-hydrogen in the polymer chain in which the nitrogen atom of the amine derivative grows is stabilized by hydrogen bonding, thereby preparing polymers with the medium and high molecular weight. In addition, the polymer to be prepared has a narrow molecular weight distribution, thereby exhibiting excellent mechanical properties. Specifically, $R_{22}$ may be a $C_{3-12}$ or $C_{3-6}$ branched alkyl such as isopropyl, isobutyl, t-butyl, isopentyl, and the like, and may be isopropyl, which is more advantageous in terms of steric effects.

In addition, the indene structure has an inductive effect capable of supplying sufficient electrons by bonding $R_{21}$, specifically $C_{6-20}$ aryl substituted with one or more, or one or two $C_{1-20}$ alkyl, at position 4, thereby exhibiting higher catalytic activity. More specifically, in Chemical Formula 2, $R_{21}$ may be phenyl substituted with one or two $C_{3-6}$ branched alkyl such as 4-tert-butyl phenyl and 3,5-ditert-butyl phenyl.

In addition, $R_{23}$ bonded to N in Chemical Formula 2 may be $C_{1-20}$ linear or branched alkyl, and more specifically, $C_{3-12}$ or $C_{3-6}$ branched alkyl such as t-butyl. When $R_{23}$ has a branched structure, the transition metal compound is sterically stabilized, and the catalyst is stabilized through an electron supply effect, thereby exhibiting higher catalytic activity.

More specifically, in Chemical Formula 2, $R_{21}$ is phenyl substituted with one or two $C_{3-6}$ branched alkyl, and $R_{22}$ and $R_{23}$ may each independently be $C_{3-6}$ branched alkyl. Even more specifically, $R_{22}$ may be isopropyl.

In addition, in Chemical Formula 2, the bridge group includes a tether group of —$(CH_2)n$—O—$R_{25}$ capable of tethering to the support together with the functional group of $R_{24}$. Accordingly, it is possible to exhibit excellent supporting stability, and to maintain excellent catalytic activity to prepare a polymer having a high molecular weight.

Specifically, $R_{24}$ may be $C_{1-12}$ or $C_{1-6}$ linear or branched alkyl. More specifically, it may be $C_{1-4}$ linear alkyl or methyl to increase solubility, resulting in improved supporting efficiency.

In addition, $R_{25}$ in the tether group may be $C_{1-12}$ or $C_{1-6}$ linear or branched alkyl, and more specifically, it may be $C_{3-6}$ branched alkyl or t-butyl. When the tether group has a branched structure such as t-butyl, it can be easily detached and bonded to the support, thereby exhibiting excellent supporting stability.

In addition, n in the tether group may specifically be 3 to 8, or 4 to 6, and the tether group within the above range may have an appropriate length and thus stably exhibit catalytic activity with excellent supporting stability.

In the bridge group, A may be silicon (Si).

More specifically, in Chemical Formula 2, A is silicon, $R_{25}$ is $C_{3-6}$ branched alkyl, and n may be an integer of 4 to 6.

In addition, the second transition metal compound of Chemical Formula 2 may include a transition metal of Group 4 such as titanium (Ti), zirconium (Zr), and hafnium (Hf) as the central metal ($M_2$). When the transition metal compound contains Ti as the central metal, the catalyst exhibits more excellent polymerization activity by increasing structural openness than the case of containing other Transition metal of Group 4s such as Zr and Hf and is stabilized by the effect of supplying electrons to produce a polymer having a high molecular weight.

In Chemical Formula 2, $Z_{21}$ and $Z_{22}$ may each independently be halogen such as chloro; or $C_{1-4}$ alkyl such as methyl. More specifically, both $Z_{21}$ and $Z_{22}$ may be methyl, and in this case, better catalytic activity may be exhibited than the case where $Z_{21}$ and $Z_{22}$ are halogen.

More specifically, in Chemical Formula 2, $M_2$ is titanium, and $Z_{21}$ and $Z_{22}$ may each independently be $C_{1-4}$ alkyl.

More specifically, the compound of Chemical Formula 2 may be a compound in which A is silicon; $M_2$ is titanium; $R_{21}$ is phenyl substituted with one or two $C_{3-10}$ branched alkyl such as t-butyl; $R_{22}$ is $C_{3-6}$ branched alkyl such as isopropyl; $R_{23}$ is $C_{3-6}$ branched alkyl such as t-butyl; $R_{24}$ is $C_{1-4}$ linear alkyl such as methyl; $R_{25}$ is $C_{3-6}$ branched alkyl such as t-butyl; $Z_{21}$ and $Z_{22}$ are each independently $C_{1-4}$ alkyl such as methyl; and n is an integer of 4 to 6.

The second transition metal compound represented by the Chemical Formula 2 may be a compound represented by one of the following structural formulae, but is not limited thereto:

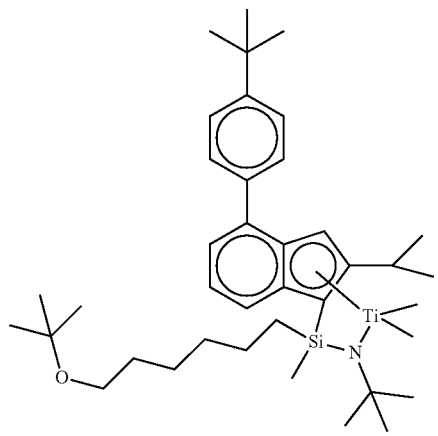

-continued

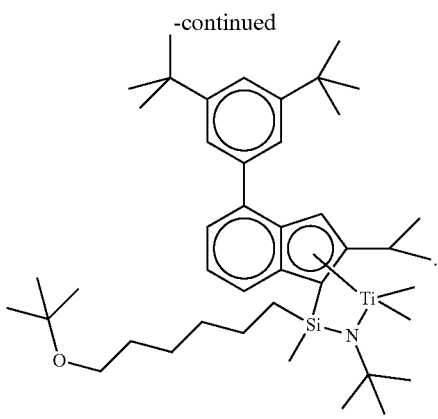

The second transition metal compound described above may be prepared by lithiation of a ligand compound of the following Chemical Formula 3, followed by reacting with a halide containing a transition metal of Group 4:

[Chemical Formula 3]

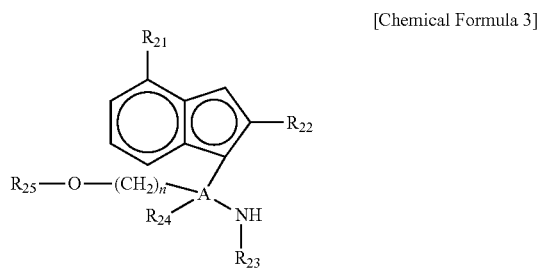

In Chemical Formula 3, A, $R_{21}$ to $R_{25}$, and n are the same as defined above.

The following Reaction Scheme 1 represents a process of preparing the second transition metal compound of Chemical Formula 2 according to one embodiment of the present invention. The following Reaction Scheme 1 is only an example for explaining the present invention, but the present invention is not limited thereto:

[Reaction Scheme 1]

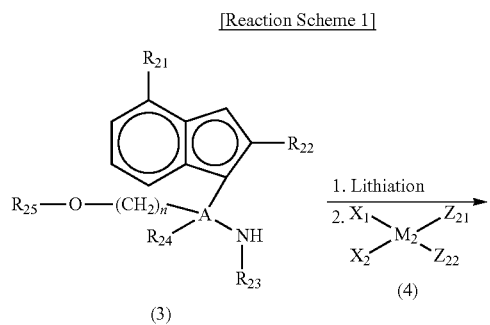

-continued

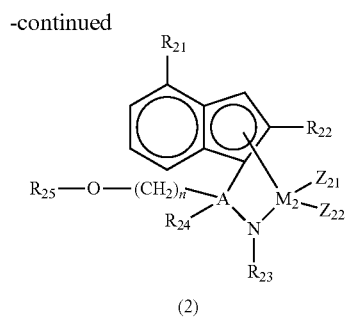

(2)

In Reaction Scheme 1, A, $M_2$, $R_{21}$ to $R_{25}$, $Z_{21}$, $Z_{22}$ and n are the same as defined above, and $X_1$ and $X_2$ are each independently halogen.

As in Reaction Scheme 1, a compound (2) of Chemical Formula 2 may be prepared by reacting a ligand compound (3) of Chemical Formula 3 with alkyl lithium such as n-butyllithium (NBL) for lithiation, and then reacting with a transition metal of Group 4-containing halide (4) such as $TiCl_4$. In addition, when each of $Z_{21}$ and $Z_{22}$ in the compound (2) of Chemical Formula 2 is $C_{1-10}$ alkyl, an alkylating agent for alkylation of metal M, such as MMB (Methyl Magnesium Bromide), may be additionally added after the lithiation.

In addition, the ligand compound (3) used in the preparation of the compound (2) of Chemical Formula 2 may be prepared by a synthesis process as in Reaction Scheme 2 below. The Reaction Scheme 2 is only an example for explaining the present invention, and the present invention is not limited thereto.

[Reaction Scheme 2]

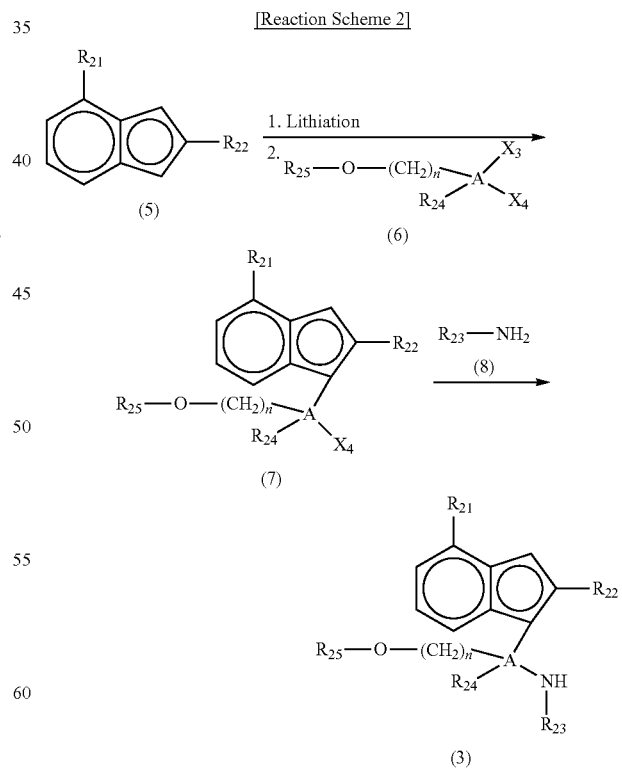

In Reaction Scheme 2, A, $R_{21}$ to $R_{24}$, and n are the same as defined above, and $X_3$ and $X_4$ are each independently halogen.

Referring to Reaction Scheme 2, the ligand compound (3) may be prepared including the steps of reacting an indene-based compound (5) as a Cp unit with alkyl lithium such as n-butyllithium (NBL) to perform lithiation; reacting the resulting reactant with a raw material (6) for providing a tether group to prepare a compound (7) in which a tether group is bonded to an indene structure; and reacting the compound (7) with a primary amine (8) having a substituent of $R_3$ such as t-BuNH$_2$.

The reaction in each step may be performed by applying known reactions, and a more detailed synthesis method may be referred to Preparation Examples to be described later.

As described above, the hybrid supported catalyst including the first and second transition metal compounds may effectively provide a polyolefin, in particular, a high-density polyethylene capable of improving tensile strength due to an increase in the degree of cross-linking when preparing a chlorinated polyolefin and a chlorinated compound, because the polyolefin has a minimized low molecular weight content and a broad molecular weight distribution by forming a high molecular weight tail in the molecular weight distribution curve. In addition, the above-described effect may be further enhanced by controlling a mixing ratio of the first and second transition metal compounds in the hybrid supported catalyst. Specifically, the mixing molar ratio of the first and second transition metal compounds may be 1:3 to 3:1, or 1:1.5 to 2:1.

In addition, in the hybrid supported catalyst, the first and second transition metal compounds are included in the form of a supported catalyst supported on a support. When the transition metal compounds are used in the form of a supported catalyst, it is possible to further improve morphology and physical properties of the polyethylene to be prepared, and it may be suitably used for slurry polymerization, bulk polymerization, and gas phase polymerization.

Specifically, the support may have a hydroxyl group, a silanol group, or a siloxane group having high reactivity on its surface. The support may be surface-modified by calcination, or may be dried to remove moisture from the surface. For example, the support may be silica prepared by calcining silica gel, silica dried at high temperature, silica-alumina, or silica-magnesia, and it may usually contain oxides, carbonates, sulfates, or nitrates such as Na$_2$O, K$_2$CO$_3$, BaSO$_4$, Mg(NO$_3$)$_2$ and the like.

The support is preferably calcined or dried at 200 to 600° C., more preferably 250 to 600° C. When the temperature is less than 200° C., the support contains too much moisture, so that the moisture on the surface may react with the cocatalyst. In addition, a cocatalyst supporting ratio may be relatively high due to excess hydroxyl groups, but this requires a large amount of cocatalyst. When the temperature is higher than 600° C., pores on the surface of the support may be combined with each other to reduce surface area, and many hydroxyl groups or silanol groups may be lost from the surface, leaving only siloxane groups. Thus, reactive sites with cocatalyst may be reduced, which is not preferable.

The amount of hydroxyl groups may be controlled by the preparation method, the preparation conditions, or the drying conditions such as temperature, time, vacuum or spray drying of the support. When the amount of hydroxyl groups is excessively low, reactive sites with cocatalyst may be insufficient. When the amount of hydroxyl groups is excessively high, it may be caused by moisture besides the hydroxyl groups present on the surface of support particles, which is not desirable. For example, the amount of hydroxyl groups on the surface may be 0.1 to 10 mmol/g, or 0.5 to 5 mmol/g.

Among the above-mentioned supports, the silica prepared by calcining silica, particularly silica gel, has little catalyst released from the surface of the support in the polymerization process of the propylene, because the transition metal compound is chemically bonded to and supported on the silica support. As a result, when the polyethylene is prepared by slurry polymerization or gas phase polymerization, a fouling phenomenon, sticking to the wall surface of the reactor or with each other, may be minimized.

When the transition metal compounds are used in the form of a supported catalyst, the content of the first and second transition metal compounds may be 10 μmol or more, 30 μmol or more or 60 μmol or more, and 120 μmol or less, or 100 μmol or less based on a weight of the support, for example, 1 g of silica. When supported within the above content range, the supported catalyst may exhibit appropriate activity, which is advantageous in terms of maintaining catalytic activity.

The hybrid supported catalyst having the above-described configuration exhibits excellent polymerization activity, and a polyethylene having a structure optimized to improve tensile strength of a chlorinated polyethylene or a chlorinated compound can be prepared.

The hybrid supported catalyst may itself be introduced into the polymerization system, or may be dissolved or diluted in a C5 to C12 aliphatic hydrocarbon solvent such as pentane, hexane, heptane, nonane, decane and an isomer thereof, in an aromatic hydrocarbon solvent such as toluene and benzene, or in a hydrocarbon solvent substituted with chlorine such as dichloromethane and chlorobenzene, and then introduced into the polymerization system. The solvent used herein is preferably used after removing a small amount of water or air, which acts as a catalyst poison, by treating with a small amount of alkyl aluminum.

In addition, the above catalyst composition may further include a cocatalyst in terms of improving the activity and stability. The cocatalyst may include one or more of compounds represented by the following Chemical Formula 9, Chemical Formula 10, and Chemical Formula 11:

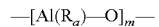 [Chemical Formula 9]

in Chemical Formula 9, $R_a$'s may be the same as or different from each other, and each independently, halogen; C$_{1-20}$ hydrocarbon; or halogen-substituted C$_{1-20}$ hydrocarbon; and m is an integer of 2 or more;

 [Chemical Formula 10]

in Chemical Formula 10, $R_b$'s may be the same as or different from each other, and each independently, halogen;

C$_{1-20}$ hydrocarbon; or halogen-substituted C$_{1-20}$ hydrocarbon; and

J is aluminum or boron;

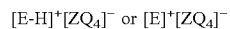 [Chemical Formula 11]

in Chemical Formula 11,

E is a neutral or cationic Lewis base;

H is a hydrogen atom;

Z is an element of Group 13; and

Q's may be the same as or different from each other, and each independently, a C$_{6-20}$ aryl or C$_{1-20}$ alkyl group, of which one or more hydrogen atoms are unsubstituted or substituted with halogen, C$_{1-20}$ hydrocarbon, alkoxy, or phenoxy.

Examples of the compound represented by Chemical Formula 9 may include $C_{1-20}$ alkylaluminoxane-based compounds, such as methylaluminoxane, ethylaluminoxane, isobutylaluminoxane, butylaluminoxane, etc., and among them, any one thereof or a mixture of two or more thereof may be used.

Further, examples of the compound represented by Chemical Formula 10 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, or the like, and more specifically, it may be selected from trimethylaluminum, triethylaluminum, and triisobutylaluminum.

Further, examples of the compound represented by Chemical Formula 11 may include triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o, p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetrapentafluorophenylaluminum, diethylammoniumtetrapentafluorophenylaluminum, triphenylphosphoniumtetraphenylaluminum, trimethylphosphoniumtetraphenylaluminum, tripropylammoniumtetra(p-tolyl)boron, triethylammoniumtetra(o, p-dimethylphenyl)boron, tributylammoniumtetra(p-trifluoromethylphenyl) boron, triphenylcarboniumtetra(p-trifluoromethylphenyl) boron, triphenylcarboniumtetrapentafluorophenylboron, or the like, and among them, any one thereof or a mixture of two or more thereof may be used.

Among the above-described cocatalysts, the cocatalyst may be the compound represented by Chemical Formula 9, and more specifically, a $C_{1-20}$ alkylaluminoxane-based compound such as methylaluminoxane, etc., considering that the cocatalyst may exhibit more excellent catalytic activity when used with the transition metal compound. The alkylaluminoxane-based compound acts as a scavenger of hydroxyl groups present on the support surface to improve catalytic activity, and converts the halogen group of the catalyst precursor into a methyl group to promote chain growth during polymerization of polyethylene.

The cocatalyst may be supported in an amount of 0.1 mmol or more, or 5 mmol or more, or 8 mmol or more, or 10 mmol or more, and 25 mmol or less, or 20 mmol or less, based on the weight of the support, e.g., 1 g of silica. When the cocatalyst is included in the above content range, it is possible to sufficiently obtain the effect of improving the catalytic activity due to use of the cocatalyst and the effect of reducing the generation of fines.

In addition, the catalyst composition may further include an antistatic agent. As the antistatic agent, ethoxylated alkylamine, specifically, a compound represented by the following Chemical Formula 12 may be used. When the catalyst composition includes the antistatic agent, generation of static electricity is suppressed during the polyethylene polymerization process, thereby further improving the physical properties of the prepared polyethylene.

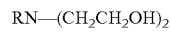

$RN—(CH_2CH_2OH)_2$         [Chemical Formula 12]

in Chemical Formula 12, R may be $C_{8-30}$ alkyl, and when R includes an alkyl group having the number of carbon in the above range, it may exhibit the effect of reducing fines through an excellent antistatic action without causing an unpleasant odor.

More specifically, the ethoxylated alkylamine may be a compound having Chemical Formula 12, wherein R is $C_{8-22}$ linear alkyl, or $C_{10-18}$ linear alkyl, or $C_{13-15}$ linear alkyl, and these compounds may be used alone or in a mixture of two or more thereof. Specific examples thereof may include N,N-bis(2-hydroxyethyl)tridecylamine, or N,N-bis(2-hydroxyethyl)pentadecylamine, etc., and commercially available Atmer 163™ (available from CRODA) may be used.

When the antistatic agent is further included, it may be included in an amount of 0.5 parts by weight or more, 1 part by weight or more, or 2 parts by weight or more, and 20 parts by weight or less, 10 parts by weight or less, or 7 parts by weight or less, based on 100 parts by weight of the support, e.g., silica.

The above-described cocatalyst and antistatic agent may be used in combination with the above-described hybrid supported catalyst, respectively, or may be used in a state of being supported on the support in the hybrid supported catalyst. When they are used in a state of being supported on the support in the hybrid supported catalyst, the catalyst composition may be prepared by a preparation method including the steps of supporting the cocatalyst compound on the support, and supporting the transition metal compound on the support; and introducing the antistatic agent in a slurry state into the support on which the cocatalyst and the transition metal compounds are supported, followed by heat treatment. In this regard, the supporting of the transition metal compound may be performed by supporting the first transition metal compound and then supporting the second transition metal compound, or vice versa. The supported catalyst having a structure determined according to such a supporting order may exhibit a higher catalytic activity and excellent process stability in the polyethylene preparation process.

The catalyst composition may be used in the form of a slurry or a dilution in a solvent according to a polymerization method, or may be used in the form of a mud catalyst mixed with a mixture of oil and grease.

When the catalyst composition is used in the form of a slurry or a dilution in a solvent, the solvent is an aliphatic hydrocarbon solvent having 5 to 12 carbon atoms suitable for the polymerization process of propylene monomer, such as pentane, hexane, heptane, nonane, decane, and isomers thereof, and aromatic hydrocarbon solvents such as toluene and benzene, or chlorine atom-substituted hydrocarbon solvents, such as dichloromethane and chlorobenzene, or the like, and any one or a mixture of two or more thereof may be used. In this case, the catalyst composition may further include the above solvent, and a small amount of water or air, which may act as a catalyst poison, may be removed by treating the solvent with a small quantity of alkyl aluminum before use.

On the other hand, the polymerization reaction for preparing a polyethylene may be performed using a continuous slurry polymerization reactor, a loop slurry reactor, a gas-phase reactor, or a solution reactor. However, according to the method of the embodiment, a slurry polymerization or a gas phase polymerization is more appropriate in order to more effectively control the molecular weight distribution.

In particular, the polymerization reaction may be performed by a slurry phase polymerization in a hydrocarbon-based solvent (for example, an aliphatic hydrocarbon-based solvent such as hexane, butane, or pentane). As the first and second transition metal compounds according to the present disclosure have excellent solubility in aliphatic hydrocarbon-based solvents, they are stably dissolved and supplied to the reaction system, and thus the polymerization reaction can be effectively performed.

Further, the method of preparing a polyethylene according to one embodiment of the present invention may be carried out in a single-CSTR reactor.

In the polymerization reactor, the polymerization may be carried out, for example, in the presence of an inert gas such as nitrogen. The inert gas may play a role in prolonging the reaction activity of the metallocene compound included in the catalyst by suppressing the rapid reaction of the metallocene catalyst at the beginning of the polymerization reaction.

In addition, the polymerization reaction is performed while introducing hydrogen gas.

The hydrogen gas introduced during the polymerization reaction activates the inert site of the metallocene catalyst and causes a chain transfer reaction, thereby controlling the molecular weight and molecular weight distribution. In the preparation of a polyethylene according to the present disclosure, hydrogen gas may be introduced in an amount of 0.001 parts by weight or more, or 0.005 parts by weight or more, and 15 parts by weight or less, 5 parts by weight or less, 1 parts by weight or less, or 0.015 parts by weight or less based on 100 parts by weight of the ethylene monomer. When hydrogen gas is introduced within the above-described range in the presence of the hybrid supported catalyst as described above, the optimized molecular structure and physical properties of the polyethylene according to the present disclosure may be achieved.

In addition, the temperature during the polymerization reaction may be 70° C. to 100° C., or 80° C. to 90° C. When the polymerization temperature is too low, it is not preferred in terms of the polymerization rate and productivity. On the contrary, when the polymerization temperature is higher than necessary, fouling in the reactor may be caused.

In addition, a polymerization pressure may be 6.8 to 8.7 kg/cm$^2$, 7.0 to 8.5 kg/cm$^2$, or 7.0 to 7.5 kg/cm$^2$ to ensure optimum productivity. The polymerization pressure may be about 6.8 kg/cm$^2$ or more to prevent blocking due to excessive production of high molecular weight and to optimize productivity, and may be about 8.7 kg/cm$^2$ or less to prevent unit degradation of ethylene source under high pressure polymerization conditions.

In addition, an organic solvent may be further used as a reaction medium or diluent in the polymerization reaction. Such an organic solvent may be used in an amount sufficient to properly perform a slurry-phase polymerization, etc. in consideration of the content of the ethylene monomer.

In addition, trialkylaluminum such as triethylaluminum may be optionally added during the polymerization reaction.

When moisture or impurity is present in the polymerization reactor, a part of the catalyst is decomposed. The trialkylaluminum acts as a scavenger to capture moisture or impurities in the reactor or moisture contained in the monomer in advance. Thus, activity of the catalyst used in the preparation may be maximized, and as a result, a homopolyethylene having excellent physical properties, particularly, a narrow molecular weight distribution may be more efficiently prepared. Specifically, in the trialkylaluminum, alkyl is as defined above, specifically, $C_{1-20}$ alkyl, and more specifically, $C_{1-6}$ linear or branched alkyl such as methyl, ethyl, isobutyl, or the like.

The trialkylaluminum (based on 1M) may be added in an amount of 10 cc or more and 50 cc or less, or 30 cc or less based on 1 kg of ethylene monomers. When the polymerization reaction is performed in the presence of trialkylaluminum in this content range, a homopolyethylene having excellent strength characteristics may be more easily prepared.

A polyethylene having an optimized molecular structure, particularly, a molecular structure having a minimized content of low molecular weight and a high content of high molecular weight is prepared by the above-described preparation method. The polyethylene can increase the degree of cross-linking in the preparation of chlorinated polyethylene, and as a result, can greatly improve tensile strength.

The polyethylene may be a homopolymer of ethylene that does not contain a separate copolymer. For example, when the polyethylene is an ethylene homopolymer, preferably, a high-density polyethylene (HDPE), the above-described physical properties may be more appropriately satisfied. The high-density polyethylene has excellent softening point, hardness, strength and electrical insulation, and thus can be used in various containers, packaging films, fibers, pipes, and the like.

The Preparation of Chlorinated Polyethylene

According to another embodiment of the present disclosure, there are provided a chlorinated polyethylene prepared by chlorinating the above-described polyethylene with chlorine, and a preparation method thereof.

Specifically, the preparation method of a chlorinated polyethylene includes the steps of: preparing a polyethylene by polymerizing ethylene-based monomers in the presence of a catalyst composition including a hybrid supported catalyst in which at least one first transition metal compound represented by the Chemical Formula 1 and at least one second transition metal compound represented by the Chemical Formula 2 are supported on a support while introducing hydrogen; and chlorinating the polyethylene by treating it with chlorine.

Specific examples of the reaction conditions in the step of polymerizing ethylene-based monomers to prepare the polyethylene, the first and second transition metal compounds, the support, the cocatalyst, and the hybrid supported catalyst including the same are as described above.

In addition, the chlorination for polyethylene may be performed by an aqueous phase method in which the polyethylene is reacted with chlorine in a suspension state, or by an acid phase method in which the polyethylene is reacted with chlorine in an aqueous HCl solution. For example, the aqueous phase method is a method of chlorination using an emulsifier and a dispersant together with water, and the acid phase method is a method of chlorinating an acid aqueous solution such as an aqueous hydrochloric acid (HCl) solution using an emulsifier and a dispersant More specifically, in the preparation method of a chlorinated polyethylene according to the present disclosure, the chlorination reaction may be carried out by dispersing the prepared polyethylene with water, an emulsifier and a dispersant, and then adding a catalyst and chlorine to react.

As the emulsifier, polyether or polyalkylene oxide may be used. The dispersant may be a polymer salt or an organic acid polymer salt. The organic acid may be methacrylic acid or acrylic acid.

The catalyst is, for example, a chlorination catalyst, and another example thereof is a peroxide or an organic peroxide. The chlorine may be used alone or may be mixed with an inert gas and then used.

The chlorination reaction may be performed at a temperature of 60° C. to 150° C., 90 to 140° C., or 120 to 140° C.

In addition, the chlorination reaction may be performed for about 10 minutes to 10 hours, 1 hour to 6 hours, or 2 hours to 4 hours.

For example, the chlorination reaction may be performed by dispersing 100 parts by weight of polyethylene, 0.01 to 1.0 parts by weight or 0.05 to 0.5 parts by weight of an emulsifier, and 0.1 to 10 parts by weight or 0.5 to 5.0 parts by weight of a dispersant in water, and then adding 0.01 to 1.0 parts by weight or 0.05 to 0.5 parts by weight of a catalyst and 80 to 200 parts by weight or 100 to 150 parts by weight of chlorine to react.

The chlorinated polyethylene prepared by the above reaction or chlorination process may be further subjected to a neutralization process, a washing process and a drying process, and thus may be obtained in a powder form.

The neutralization process may be, for example, a process of neutralizing the reactant which has already been subjected to the chlorination process with a base solution at 70 to 90° C., or 75 to 80° C. for 4 to 8 hours.

The chlorinated polyethylene obtained according to the preparation method of the embodiment has a high degree of cross-linking and an appropriate level of Mooney viscosity, and thus can exhibit excellent tensile strength.

Specifically, the chlorinated polyethylene has a Mooney viscosity (MV) of 70 to 80, more specifically 70 or more and 80 or less, or 76 or less measured at a temperature of 121° C.

The Mooney viscosity of the chlorinated polyethylene may be measured using a Mooney viscometer, and specifically measured by rotating a rotor for 4 min after preheating at 121° C. for 1 min. A more specific method thereof will be described in detail in Experimental Examples to be described later.

In addition, the chlorinated polyethylene may be, for example, a random chlorinated polyethylene.

The above-described chlorinated polyethylene has excellent chemical resistance, weather resistance, flame retardancy, processability, and impact strength reinforcing effect, and thus may be useful for wires or cables.

The Compound

According to another embodiment of the present disclosure, there is provided a compound exhibiting excellent tensile strength properties containing the chlorinated polyethylene prepared by the above-described method.

The compound may specifically be a CPE compound containing a cross-linked chlorinated polyethylene prepared by cross-linking the chlorinated polyethylene in the presence of a peroxide-based cross-linking agent.

The cross-linking reaction may be performed at 140 to 230° C., and a peroxide-based cross-linking agent such as dicumyl peroxide may be used as the cross-linking agent. In addition, an antioxidant may be optionally further added during the cross-linking reaction.

For example, the chlorinated polyethylene (CPE) compound may contain 100 parts by weight to 280 parts by weight of inorganic additives such as talc and carbon black, 20 parts by weight to 50 parts by weight of a plasticizer, and 1 part by weight to 20 parts by weight of a cross-linking agent, based on 100 parts by weight of a chlorinated polyethylene.

The compound containing the chlorinated polyethylene may exhibit excellent tensile strength, and specifically, the tensile strength measured at 500 mm/min according to ASTM D 412 is 12 or more, or 12 to 14.

In addition, a conventional method in the art may be applied to the method of preparing a molded product from the chlorinated polyethylene according to the present disclosure. For example, the chlorinated polyethylene may be roll-mill compounded and extruded to manufacture a molded product.

Advantageous Effects

The polyethylene according to the present disclosure has a molecular structure having a low content of low molecular weight and a high content of high molecular weight, and thus can improve tensile strength while maintaining excellent processability and Mooney viscosity characteristics when preparing a chlorinated polyethylene compound.

DETAILED DESCRIPTION OF THE EMBODIMENTS

The present invention will be described in more detail with the following examples. However, these examples are for illustrative purposes only, and the invention is not intended to be limited by these examples.

Preparation of First Transition Metal Compound

Synthesis Example 1: Preparation of [tert-Bu-O—(CH$_2$)$_6$-C$_5$H$_4$]$_2$ZrCl$_2$ tert-Butyl-O—(CH$_2$)$_6$—Cl was prepared by the method shown in Tetrahedron Lett. 2951 (1988) using 6-chlorohexanol, and reacted with NaCp to obtain tert-Butyl-O—(CH$_2$)$_6$—C$_5$H$_5$ (yield 60%, b.p. 80° C./0.1 mmHg).

In addition, tert-Butyl-O—(CH$_2$)$_6$—C$_5$H5 was dissolved in THF at −78° C., and normal butyllithium (n-BuLi) was slowly added thereto. Thereafter, it was heated to room temperature and reacted for 8 hours. The lithium salt solution synthesized as described above was slowly added to a suspension solution of ZrCl$_4$(THF)$_2$ (1.70 g, 4.50 mmol)/THF (30 mL) at −78° C., and further reacted for about 6 hours at room temperature.

All volatiles were dried in vacuum and the resulting oily liquid material was filtered by adding a hexane solvent. The filtered solution was dried in vacuum, and hexane was added to obtain a precipitate at a low temperature (−20° C.). The obtained precipitate was filtered at a low temperature to obtain [tert-Bu-O—(CH$_2$)$_6$—C$_5$H$_4$]$_2$ZrCl$_2$ in the form of a white solid (yield 92%).

$^1$H NMR (300 MHz, CDCl$_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}$C NMR (CDCl$_3$): 135.09, 116.66, 112.28, 72.42, 61.52, 30.66, 30.61, 30.14, 29.18, 27.58, 26.00.

Preparation of Second Transition Metal Compound

Synthesis Example 2

Step 1: Preparation of Ligand Compound 4-(3,5-di-tert-butylphenyl)-2-isopropyl-1H-indene (1.39 g, 4 mmol) was added in a 50 ml schlenk flask as a Cp unit, and THF (13 ml) was add thereto, followed by cooling to −20° C. or less. After the cooled mixed solution was stirred for 5 minutes, NBL (1.7 ml, 2.5M in hexane) was added and reacted for overnight to prepare lithiated Cp. When the NBL was added, the mixed solution turned reddish brown.

Dichloro(tert-butoxy)hexyl)methylsilane (1.14 g) was added in another 100 mL schlenk flask, and THF (13 ml) was add thereto. After cooling the schlenk flask to −20° C. or less, the lithiated Cp prepared above was added dropwise to react. When the reaction was completed, the solvent in the resulting reactant was removed by distillation under vacuum reduced pressure, and the resulting salt was filtered off using hexane (Hex). After t-BuNH$_2$ (1.7 ml) was added to the resulting reactant to react, the resulting precipitate was filtered off using hexane, and a ligand compound of 1-(6-(tert-butoxy)hexyl)-N-(tert-butyl)-1-(4-(3,5-di-tert-butylphenyl)-2-isopropyl-1H-inden-1-yl)-1-methylsilanamine was obtained (yellow oil, 2.41 g, yield 97% (molar basis)).

NMR (400 MHz, C6D6), 7.70-7.68 (m, 1H), 7.60-7.47 (m, 4H), 7.34-7.19 (m, 2H), 7.07 (s, 0.5H), 6.89 (s, 0.5H), 3.36-3.21 (m, 4H), 3.12 (s, 1H), 2.52-2.44 (m, 0.5H), 2.00-1.92 (m, 0.5H), 1.72-1.39 (m, 8H), 1.39 (s, 9H), 1.31 (s, 9H), 1.23 (s, 3H) 1.19 (s, 3H), 1.13 (s, 9H) 0.98 (s, 9H) 0.32 (s, 1H), 0.25 (s, 0.5H), 0.20 (s, 1H), 0.12 (s, 0.5H)

Step 2: Preparation of Transition Metal Compound

The ligand compound of 1-(6-(tert-butoxy)hexyl)-N-(tert-butyl)-1-(4-(3,5-di-tert-butylphenyl)-2-isopropyl-1H-inden-1-yl)-1-methylsilanamine (2.4 g, 3.9 mmol) prepared in step 1 was added in a 100 ml schlenk flask, and toluene (13 ml) was add thereto, followed by cooling to −20° C. or less. After sufficiently cooling by stirring for 5 minutes, NBL (5.1 ml, 2.5 M in hexane) was added to the resulting mixed solution to perform lithiation. It was confirmed that the color of the mixed solution turned brown after lithiation. When the lithiation was completed, the resulting reaction solution was cooled to 0° C. After NMB (13 ml, 3 M in ether) was added thereto, the temperature was immediately lowered to −20° C., and TiCl$_4$ (3.9 ml, 1 M in toluene) was added. Smoke was generated at the time of addition and the reaction solution immediately turned brown. After the addition, o/n stirring was performed, and then the salt was removed through a filter to obtain a transition metal compound (2a) (brown oil, 2.16 g, yield 80% (molar basis)).

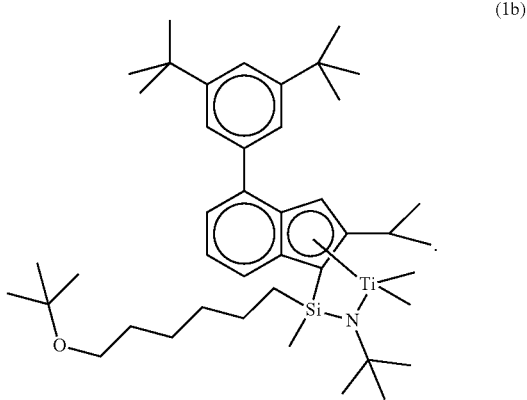

(1b)

NMR (400 MHz, C6D6), 7.79-7.76 (m, 2H), 7.64-7.47 (m, 5H), 3.35-3.21 (m, 2H), 2.76-2.49 (s, 2H), 1.99-1.91 (m, 4H), 1.70-1.60 (m, 4H), 1.53 (s, 9H), 1.51-1.44 (m, 4H), 1.36 (s, 9H), 1.30 (s, 9H), 1.20 (s, 6H), 1.13 (s, 9H), 0.59 (s, 3H), 0.12 (s, 3H)

Preparation of Hybrid Supported Catalyst

Synthesis Example 3

(1) Preparation of Support

Silica (SYLOPOL948™, manufactured by Grace Davison) was dehydrated and dried at a temperature of 600° C. for 12 hours under vacuum.

(2) Preparation of Hybrid Supported Catalyst 10 g of the silica dried in step (1) was introduced to a glass reactor, and 100 mL of toluene was additionally added and stirred. After sufficient dispersion of the silica, 60.6 mL of 10 wt % methylaluminoxane (MAO)/toluene solution was added thereto. Thereafter, the temperature was raised to 80° C. and the mixture was slowly reacted while stirring at 200 rpm for 16 hours. After lowering the temperature to 40° C. again, the reaction solution was washed with a sufficient amount of toluene to remove unreacted aluminum-based compounds, and the remaining toluene was removed under reduced pressure. 100 mL of toluene was added thereto again, to which 0.24 mmol of the first transition metal compound prepared in Synthesis Example 1 dissolved in toluene was added together and reacted for 1 hour. After completion of the reaction, 0.12 mmol of the second transition metal compound prepared in Synthesis Example 2 dissolved in toluene was added and further reacted for 2 hours while stirring. After completion of the reaction, stirring was stopped and the toluene layer was separated and removed. Then, the remaining toluene was removed under reduced pressure at 40° C. to prepare a hybrid supported catalyst.

Synthesis Example 4

A hybrid supported catalyst was prepared in the same manner as in Synthesis Example 3, except that the amount of the second transition metal compound was changed to 0.06 mmol (molar ratio of first transition metal compound: second transition metal compound=4:1).

Preparation of Polyethylene

Example 1

An ethylene homopolymerization reaction was performed using the hybrid supported catalyst prepared in Synthesis Example 3 under the following conditions.

First, 30 kg/hr of hexane, 10 kg/hr of ethylene, 1 g/hr of hydrogen and 130 cc/hr of triethylaluminum (TEAL) were introduced to a 0.2 m³ single-CSTR reactor, and then the hybrid supported catalyst prepared in Synthesis Example 3 was injected thereto at 0.2 kg/hr. At this time, the reactor was maintained at a temperature of 82° C. and a pressure of 7.0 kg/cm' to 7.5 kg/cm², and the polymerization was performed for about 4 hours. Thereafter, the polymerization product was made into final polyethylene through a solvent removal plant and a dryer.

Example 2

Polyethylene was prepared in the same manner as in Example 1, except that the hydrogen was introduced at 1.5 g/hr.

Example 3

Polyethylene was prepared in the same manner as in Example 1, except that the hydrogen was introduced at 0.5 g/hr.

Comparative Example 1

High-density polyethylene (CE2080™, manufactured by LG Chem.) prepared using a Ziegler-Natta catalyst was used.

Comparative Example 2

High-density polyethylene (SC200™, manufactured by LG Chem.) prepared using a metallocene catalyst was used.

Comparative Example 3

High-density polyethylene (SC100E™, manufactured by LG Chem.) prepared using a metallocene catalyst was used.

Comparative Example 4

High-density polyethylene (CE6040X™, manufactured by LG Chem.) prepared using a Ziegler-Natta catalyst was used.

Comparative Example 5

Polyethylene was prepared in the same manner as in Example 1, except that the hydrogen was not introduced during polymerization.

Comparative Example 6

Polyethylene was prepared in the same manner as in Example 1, except that the hybrid supported catalyst prepared in Synthesis Example 4 was used.

Comparative Example 7

Commercially available polyethylene (5000CP™, manufactured by Lotte Chemical) was used.

Experimental Example 1

GPC analysis was performed on the polyethylene prepared in Examples and Comparative Examples in the following manner, and the content of each molecular weight distribution, that is, a fraction was calculated. The results are shown in Table 1 below.

Fraction (%): GPC analysis was performed, and the fraction was calculated as an area (%) occupied by log Mw section relative to a total area in the resulting molecular weight distribution curve. The sum of the fraction is 100±1, which may not be exactly 100.

The GPC analysis was specifically performed under the following conditions.

Waters PL-GPC220 was used as the gel permeation chromatography (GPC) instrument, and a Polymer Laboratories PLgel MIX-B 300 mm length column was used. An evaluation temperature was 160° C., and 1,2,4-trichlorobenzene was used for a solvent at a flow rate of 1 mL/min. Each polyethylene sample was pretreated by dissolving in 1,2,4-trichlorobenzene containing 0.0125% of BHT for 10 hours using a GPC analyzer (PL-GP220), and the sample with a concentration of 10 mg/10 mL was supplied in an amount of 200 μL. Mw and Mn were obtained using a calibration curve formed using a polystyrene standard. 9 kinds of the polystyrene standard were used with the molecular weight of 2000 g/mol, 10000 g/mol, 30000 g/mol, 70000 g/mol, 200000 g/mol, 700000 g/mol, 2000000 g/mol, 4000000 g/mol, and 10000000 g/mol.

TABLE 1

| Log Mw | Fraction (%) | | | | | | | |
|---|---|---|---|---|---|---|---|---|
| | Less than 3.5 | 3.5 or more~less than 4.0 | 4.0 or more~4.5 or less | More than 4.5~less than 5.0 | 5.0 or more~6.0 or less | More than 6.0~6.5 or less | More than 6.5~7.0 or less | More than 7.0 |
| Ex. 1 | 0.54 | 3.78 | 19.85 | 41.58 | 29.79 | 3.41 | 1.05 | 0 |
| Ex. 2 | 0.80 | 3.93 | 18.74 | 42.72 | 29.63 | 3.20 | 0.98 | 0 |
| Ex. 3 | 0.51 | 3.63 | 20.24 | 41.19 | 29.81 | 3.53 | 1.09 | 0 |
| Comp. Ex. 1 | 2.64 | 8.89 | 22.89 | 29.03 | 31.99 | 3.94 | 0.62 | 0 |
| Comp. Ex. 2 | 2.22 | 8.53 | 24.15 | 28.17 | 34.64 | 2.27 | 0.02 | 0 |
| Comp. Ex. 3 | 0.00 | 2.12 | 14.47 | 37.98 | 42.85 | 2.51 | 0.07 | 0 |
| Comp. Ex. 4 | 0.57 | 4.30 | 16.22 | 34.09 | 42.47 | 2.35 | 0 | 0 |

TABLE 1-continued

|  | Fraction (%) | | | | | | | |
| --- | --- | --- | --- | --- | --- | --- | --- | --- |
| Log Mw | Less than 3.5 | 3.5 or more~less than 4.0 | 4.0 or more~4.5 or less | More than 4.5~less than 5.0 | 5.0 or more~6.0 or less | More than 6.0~6.5 or less | More than 6.5~7.0 or less | More than 7.0 |
| Comp. Ex. 5 | 0.38 | 2.94 | 21.85 | 40.81 | 28.42 | 3.74 | 1.86 | 0 |
| Comp. Ex. 6 | 0.51 | 4.27 | 22.49 | 41.21 | 28.25 | 2.74 | 0.53 | 0 |
| Comp. Ex. 7 | 0.73 | 5.12 | 17.45 | 30.62 | 43.69 | 2.35 | 0.04 | 0 |

Experimental Example 2

The physical properties of the polyethylene prepared in Examples and Comparative Examples were measured in the following manner, and the results are shown in Table 2.

(1) Weight average molecular weight (Mw, g/mol) and molecular weight distribution (PDI, polydispersity index): GPC analysis was performed in the same manner as in Experimental Example 1, and the molecular weight distribution (PDI) was calculated by measuring a weight average molecular weight (Mw) and a number average molecular weight (Mn), and then obtaining a ratio of Mw/Mn.

(2) $MI_{5.0}$ and $MFRR_{21.6/5}$: Melt Index ($MI_{5.0}$) of the polyethylene prepared in Examples and Comparative Examples was measured in accordance with ASTM D1238 (Condition E, 190° C., 5.0 kg load). In addition, the melt flow rate ratio ($MFRR_{21.6/5}$) was calculated by dividing $MFR_{21.6}$ by $MFR_5$, and the $MFR_{21.6}$ was measured in accordance with ASTM D 1238 at 190° C. under a load of 21.6 kg and the $MFR_5$ was measured in accordance with ASTM D 1238 at 190° C. under a load of 5 kg.

(3) Density (g/cm³): Density (g/cm³) was measured in accordance with ASTM D-1505.

(4) MDR torque ($M_H$–$M_L$): MDR torque of each polyethylene sample was measured with Alpha Technologies Production MDR (Moving Die Rheometer) in order to evaluate the degree of cross-linking of polyethylene.

Specifically, a sample sheet was prepared at 140° C. for 10 min after mixing 100 g of each polyethylene sample prepared in Examples and Comparative Examples, 0.4 g of a phenolic antioxidant (AO), and 1.2 g of a cross-linking agent (DCP, dicumyl peroxide) at 80° C. Then, a $M_H$ value and a $M_L$ value of the sample sheet were measured at 180° C. for 10 min with MDR (Moving die rheometer). The MDR torque ($M_H$–$M_L$) was calculated by subtracting the $M_L$ value from the $M_H$ value. Herein, the $M_H$ is a maximum vulcanizing torque measured at full cure, and the $M_L$ is a minimum vulcanizing torque stored.

(5) Entanglement molecular weight (Me): The entanglement molecular weight (Me) was calculated from a storage modulus and a loss modulus measured with a rotational rheometer.

Specifically, a storage modulus and a loss modulus of each polyethylene sample according to Examples and Comparative Examples were measured with a rotational rheometer. Then, a plateau modulus($G_N^0$) was obtained from them and the entanglement molecular weight was calculated according to the following Equation 1.

$$M_e = (\rho RT)/G_N^0 \quad \text{[Equation 1]}$$

in Equation 1, $\rho$ is a density (kg/m³) of polyethylene measured in accordance with ASTM D-1505×0.8, R is a gas constant of polyethylene (8.314 Pa·m³/mol·K), T is an absolute temperature (K) of the measured temperature, and $G_N^0$ is a plateau modulus of polyethylene, which is a storage modulus when a loss modulus has a minimum value in a region where the storage modulus is greater than the loss modulus, wherein the storage modulus and loss modulus are measured while changing an angular frequency to 0.05 to 500 rad/s under conditions of 190° C. and 0.5% strain using a rotary rheometer.

TABLE 2

|  | Mw (g/mol) | PDI | $MI_{5.0}$ (g/10 min) | $MFRR_{21.6/5}$ | Density (g/cm³) | MDR torque ($M_H$ – $M_L$) (Nm) | Me (g/mol) |
| --- | --- | --- | --- | --- | --- | --- | --- |
| Ex. 1 | 216,000 | 5.7 | 1.25 | 10.6 | 0.948 | 11.7 | 41,300 |
| Ex. 2 | 196,000 | 6.1 | 2.41 | 10.3 | 0.950 | 11.5 | 49,500 |
| Ex. 3 | 233,000 | 5.6 | 1.0 | 10.9 | 0.947 | 11.8 | 34,800 |
| Comp. Ex. 1 | 177,000 | 9.1 | 1.30 | 15.2 | 0.958 | 5.6 | 13,800 |
| Comp. Ex. 2 | 168,000 | 5.0 | 0.8 | 16.0 | 0.955 | 7.7 | 10,300 |
| Comp. Ex. 3 | 171,000 | 4.5 | 0.8 | 11.0 | 0.950 | 9.0 | 21,500 |
| Comp. Ex. 4 | 174,000 | 4.8 | 1.0 | 11.2 | 0.952 | 6.3 | 15,400 |
| Comp. Ex. 5 | 264,000 | 5.1 | 0.49 | 11.2 | 0.945 | 12.1 | 25,100 |
| Comp. Ex. 6 | 182,000 | 6.0 | 3.0 | 14.2 | 0.953 | 10.7 | 52,600 |
| Comp. Ex. 7 | 175,000 | 5.2 | 1.2 | 12.3 | 0.952 | 9.5 | 31,700 |

Experimental Example 3

Chlorinated polyethylene was prepared using the polyethylene prepared in one of the above Examples and Comparative Examples, and physical properties of the prepared chlorinated polyethylene were evaluated by the following method. The results are shown in Table 3.

(1) Preparation of Chlorinated Polyethylene 5,000 L of water and 550 kg of polyethylene prepared in one of Examples and Comparative Examples were added to a reactor, followed by sodium polymethacrylate as a dispersant, oxypropylene and oxyethylene copolyether as an emulsifier, and benzoyl peroxite as a catalyst. Then, chlorination was carried out by injecting gaseous chlorine at a final temperature of 132° C. for 3 hours. The chlorinated reactant was neutralized with NaOH or $Na_2CO_3$ for 4 hours, washed again with running water for 4 hours, and finally dried at 120° C. to prepare a chlorinated polyethylene in a powder form.

(2) Mooney viscosity (MV)

Wrap a rotor in a Mooney viscometer with a CPE sample and close a die. After preheating to 121° C. for 1 min, the rotor was rotated for 4 min to measure MV (Mooney viscosity, 121° C., ML1+4).

TABLE 3

|  | MV |
|---|---|
| Ex. 1 | 73 |
| Ex. 2 | 71 |
| Ex. 3 | 76 |
| Comp. Ex. 1 | 72 |
| Comp. Ex. 2 | 72 |
| Comp. Ex. 3 | 85 |
| Comp. Ex. 4 | 87 |
| Comp. Ex. 5 | 86 |
| Comp. Ex. 6 | 64 |
| Comp. Ex. 7 | 83 |

Experimental Example 4

A CPE compound was prepared using the polyethylene prepared in one of the above Examples and Comparative Examples in Experimental Example 3, and physical properties were evaluated.

(1) Preparation of CPE Compound 40 wt % of the chlorinated polyethylene prepared using the polyethylene prepared in one of Examples and Comparative Examples in Experimental Example 3, 15 wt % of a plasticizer, 2 wt % of a cross-linking agent, and a residual amount of inorganic additives of talc and carbon black were compounded and processed to prepare a CPE compound specimen.

(2) MV (Mooney viscosity) of CPE compound

Wrap a rotor in a Mooney viscometer with a CPE compound sample and close a die. After preheating to 100° C. for 1 min, the rotor was rotated for 4 min to measure MV (Mooney viscosity, 100° C., ML1+4). The results are shown in Table 4.

(3) Tensile strength (MPa) of CPE compound

After cross-linking the CPE compound specimen prepared above at 160° C. for 10 minutes, the tensile strength (MPa) of the CPE compound was measured under a condition of 500 mm/min according to ASTM D-412. The results are shown in Table 4 below.

TABLE 4

|  | MV | Tensile strength (MPa) |
|---|---|---|
| Ex. 1 | 54 | 13.9 |
| Ex. 2 | 53 | 13.7 |
| Ex. 3 | 55 | 14.0 |
| Comp. Ex. 1 | 53 | 11.9 |
| Comp. Ex. 2 | 53 | 12.5 |
| Comp. Ex. 3 | 60 | 12.5 |
| Comp. Ex. 4 | 60 | 12.6 |
| Comp. Ex. 5 | 61 | 14.2 |
| Comp. Ex. 6 | 42 | 9.8 |
| Comp. Ex. 7 | 59 | 13.1 |

Referring to the results of the experiments, the CPE compounds prepared using the polyethylene of Examples 1 to 3 had improved tensile strength while maintaining excellent Mooney viscosity characteristics compared to Comparative Examples.

The invention claimed is:

1. A polyethylene having a density of 0.945 g/cm³ or more when measured in accordance with ASTM D-1505,
wherein a fraction of an area representing a high molecular weight content of log Mw>6.0 is 4 to 12%,
a fraction of an area representing a medium molecular weight content of 4.5<log Mw<5.0 is 35 to 50%, and
a fraction of an area representing a low molecular weight content of log Mw<4.0 is 10% or less,
relative to a total area of a molecular weight distribution curve drawn with a log value of weight average molecular weight as the x axis and a molecular weight distribution with respect to the log value as the y axis using gel permeation chromatography, and
an entanglement molecular weight ($M_e$) of the following Equation 1 is from 27,000 to 52,000 g/mol:

$$M_e = (\rho RT)/G_N^0 \quad \text{[Equation 1]}$$

wherein
$\rho$ is a density (kg/m³) of polyethylene measured in accordance with ASTM D-1505×0.8,
R is a gas constant of polyethylene of 8.314 Pa·m³/mol·K,
T is an absolute temperature of the measured temperature, and
$G_N^0$ is a plateau modulus of polyethylene, which is a storage modulus when a loss modulus has a minimum value in a region where the storage modulus is greater than the loss modulus, wherein the storage modulus and loss modulus are measured while changing an angular frequency to 0.05 to 500 rad/s under conditions of 190° C. and 0.5% strain using a rotary rheometer.

2. The polyethylene of claim 1, wherein the density of the polyethylene is 0.945 to 0.955 g/cm³ when measured in accordance with ASTM D-1505.

3. The polyethylene of claim 1, wherein a fraction of an area representing an ultra-high molecular weight content of 6.5<log Mw relative to a total area of a molecular weight distribution curve is 0.1 to 3% in the molecular weight distribution curve drawn using gel permeation chromatography.

4. The polyethylene of claim 1, wherein a fraction of an area representing an ultra-low molecular weight content of log Mw<3.5 is 2% or less, and a fraction of an area representing a low molecular weight content of 3.5≤log Mw<4.0 is 7% or less in the molecular weight distribution curve.

5. The polyethylene of claim 1, wherein the polyethylene has a melt index of 0.5 to 3 g/10 min when measured at a temperature of 190° C. under a load of 5 kg in accordance with ASTM D 1238.

6. The polyethylene of claim 1, wherein the polyethylene has a melt flow rate ratio obtained by dividing $MFR_{21.6}$ measured at 190° C. under a load of 21.6 kg in accordance with ASTM D 1238 by $MFR_{5.0}$ measured at 190° C. under a load of 5.0 kg in accordance with ASTM D 1238 of 10 to 20.

7. The polyethylene of claim 1, wherein the polyethylene has a weight average molecular weight of 150,000 to 300,000 g/mol.

8. The polyethylene of claim 1, wherein the polyethylene has a molecular weight distribution of 5 to 15.

9. The polyethylene of claim 1, wherein the polyethylene has an MDR torque of 7 to 12 Nm when measured at 180° C. for 10 min using a moving die rheometer.

10. The polyethylene of claim 1, wherein the polyethylene is an ethylene homopolymer.

11. the polyethylene of claim 1, wherein the density of the polyethylene is 0.945 to 0.955 g/cm$^3$.

\* \* \* \* \*